United States Patent
Wang et al.

(10) Patent No.: US 10,228,741 B2
(45) Date of Patent: *Mar. 12, 2019

(54) SERVER RACK SYSTEM

(71) Applicant: Quanta Computer Inc., Taoyuan (TW)

(72) Inventors: Tzu-Hung Wang, Taoyuan (TW);
Chao-Jung Chen, Taoyuan (TW);
Chih-Ming Chen, Taoyuan (TW);
Wei-Yi Chu, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 515 days.

This patent is subject to a terminal disclaimer.

(21) Appl. No.: 14/918,092

(22) Filed: Oct. 20, 2015

(65) Prior Publication Data
US 2016/0041592 A1 Feb. 11, 2016

Related U.S. Application Data

(63) Continuation of application No. 12/971,218, filed on Dec. 17, 2010, now Pat. No. 9,207,734.

(30) Foreign Application Priority Data

Jun. 8, 2010 (TW) .............................. 99118620 A
Jun. 30, 2010 (TW) .............................. 99121569 A

(51) Int. Cl.
| G06F 1/26 | (2006.01) |
| G06F 1/00 | (2006.01) |
| G06F 1/28 | (2006.01) |
| H02M 7/00 | (2006.01) |

(52) U.S. Cl.
CPC .............. *G06F 1/266* (2013.01); *G06F 1/263* (2013.01); *G06F 1/28* (2013.01); *H02M 7/00* (2013.01)

(58) Field of Classification Search
CPC ........................................................ G06F 1/263
See application file for complete search history.

(56) References Cited

U.S. PATENT DOCUMENTS

2007/0046103 A1* 3/2007 Belady ..................... H02G 3/00
307/12
2009/0309570 A1* 12/2009 Lehmann .................. G06F 1/26
323/318

* cited by examiner

*Primary Examiner* — Zahid Choudhury
(74) *Attorney, Agent, or Firm* — Nixon Peabody LLP; Zhou Lu

(57) ABSTRACT

A rack system for a server includes a number of server units, which includes first to the third sets of server units, voltage converter, first to third power supply circuits. The voltage converter receives and converters a three-phase alternating current (AC) power signal to provide first to third single-phase power signals. The first to the third sets of power supply circuits respectively provides firs to third direct current (DC) power signals according to the first to the third single-phase power signals. The first set to the third set of server units is respectively powered by first to the third DC power signals or respectively powered by first part, second part, and third part of the first to the third DC power signals.

21 Claims, 24 Drawing Sheets

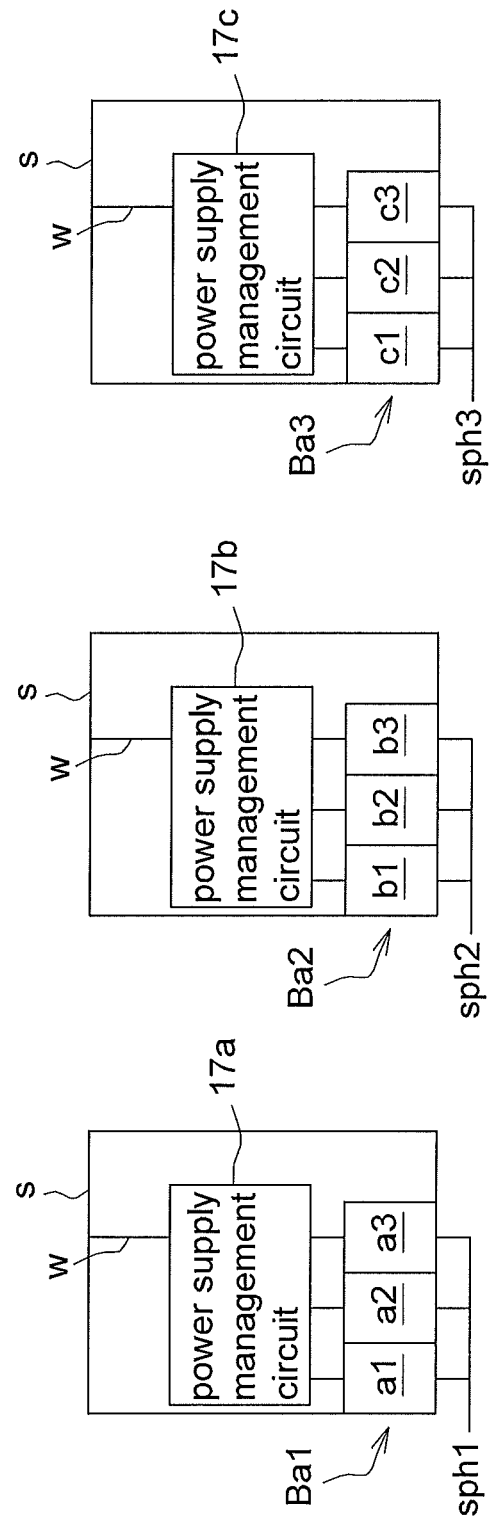

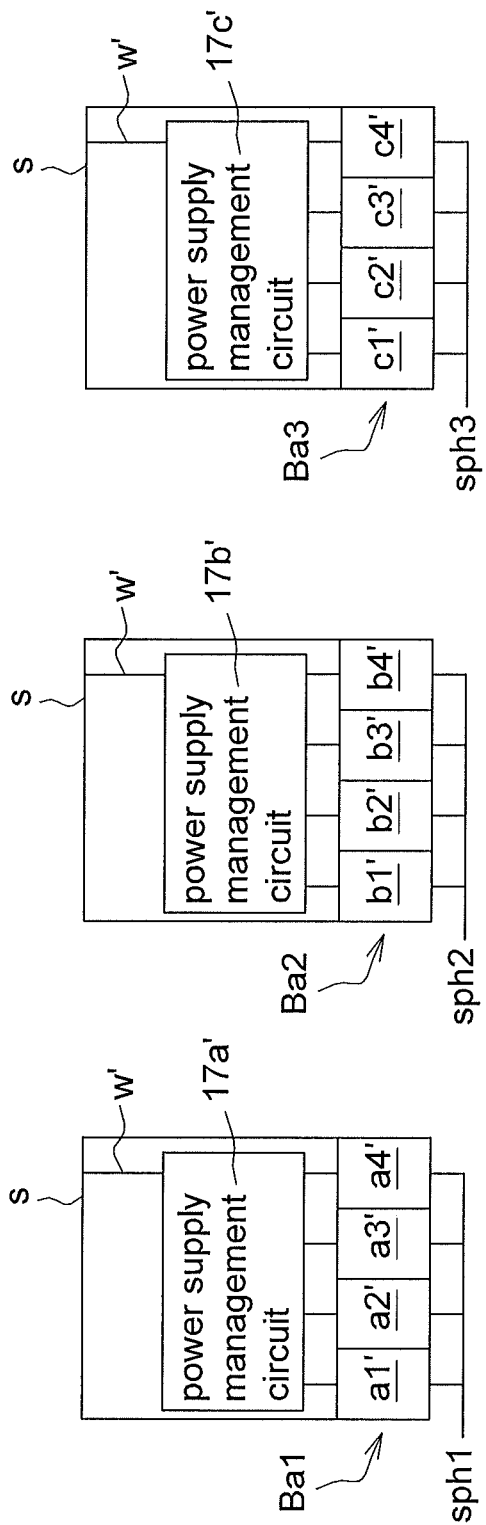

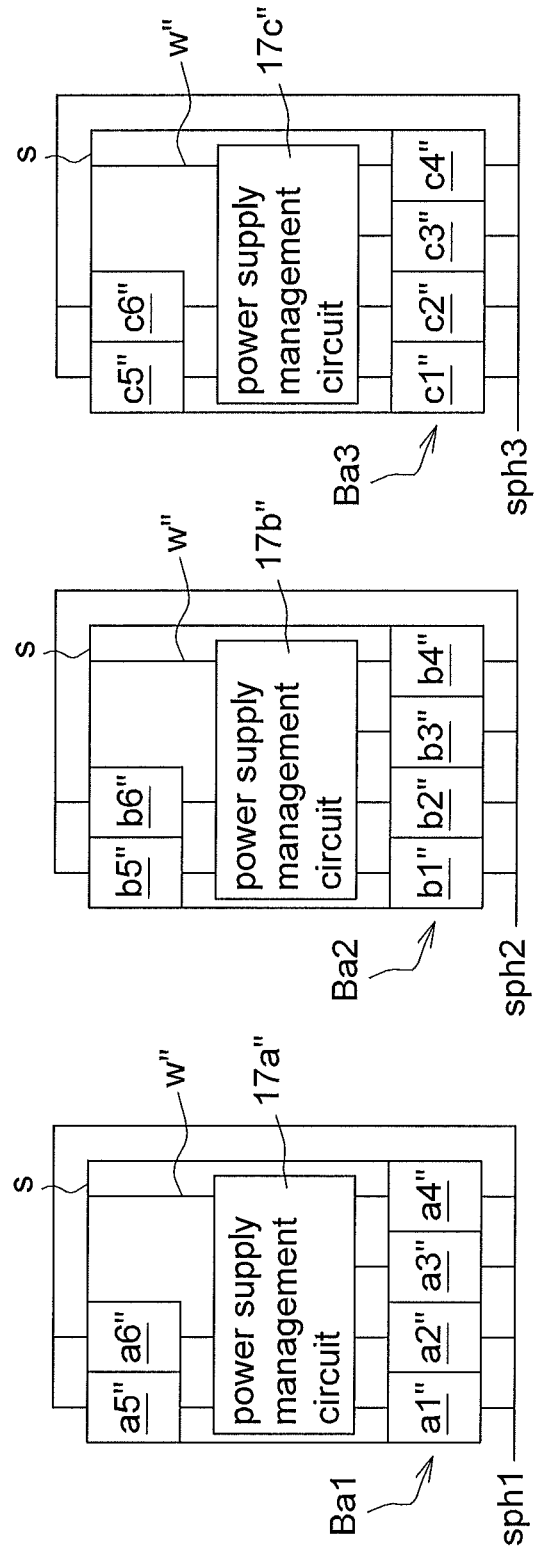

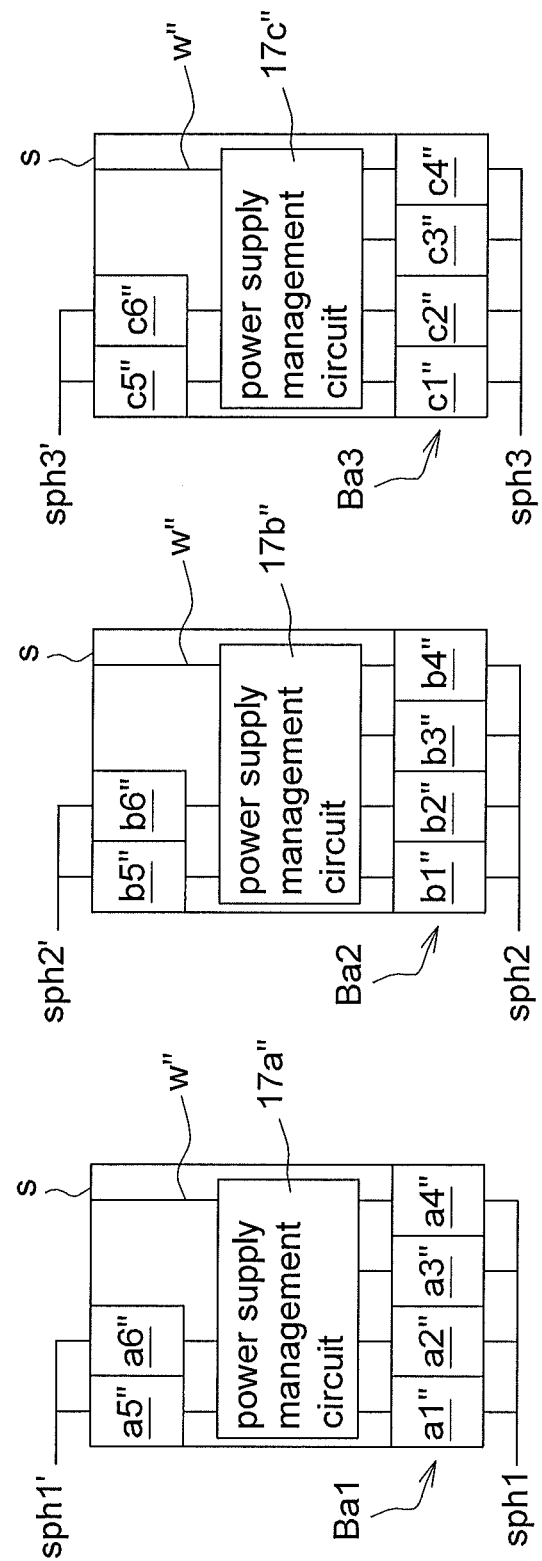

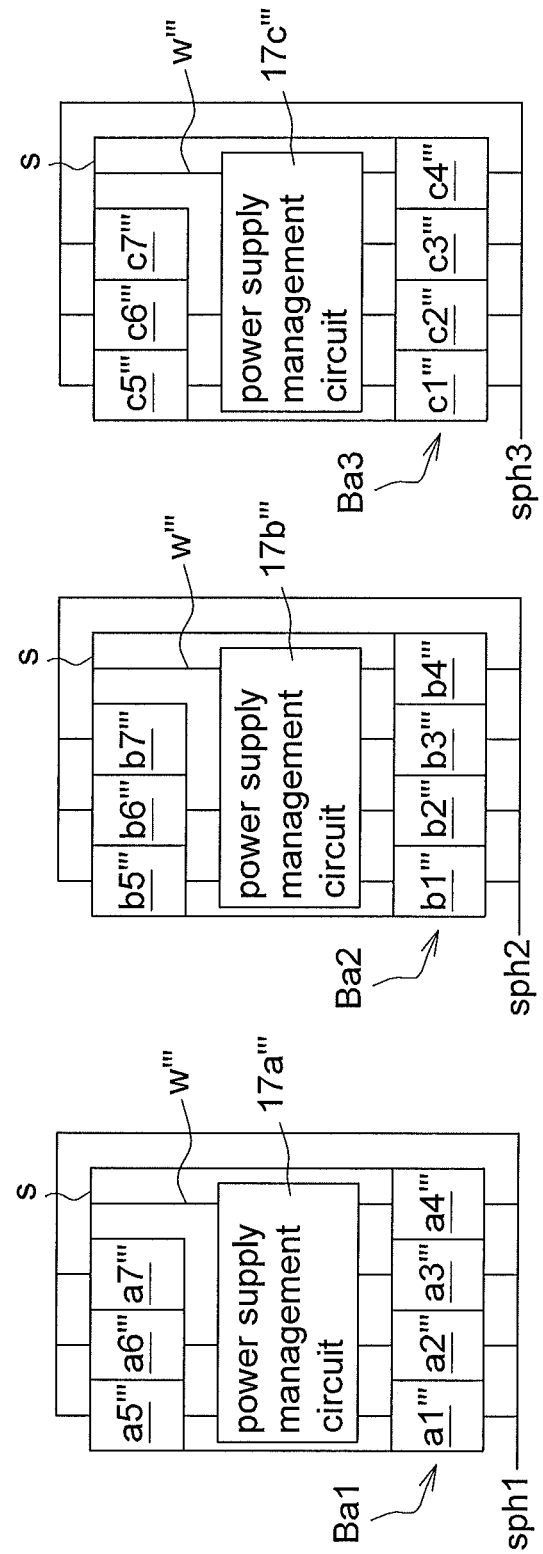

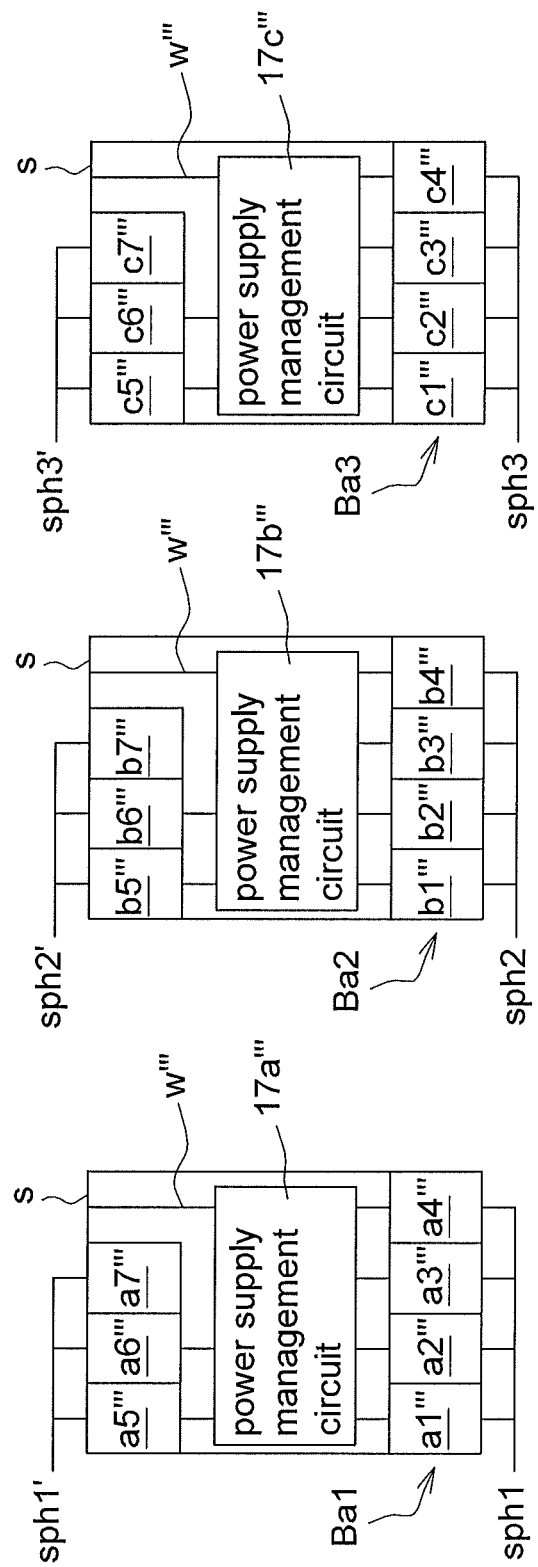

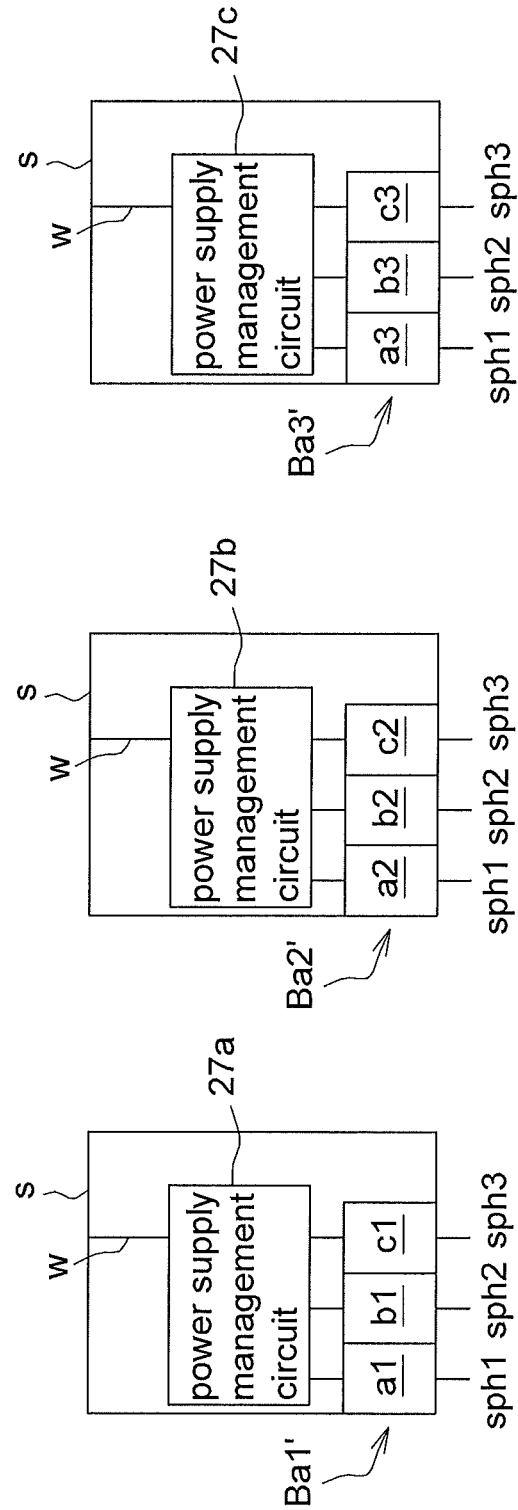

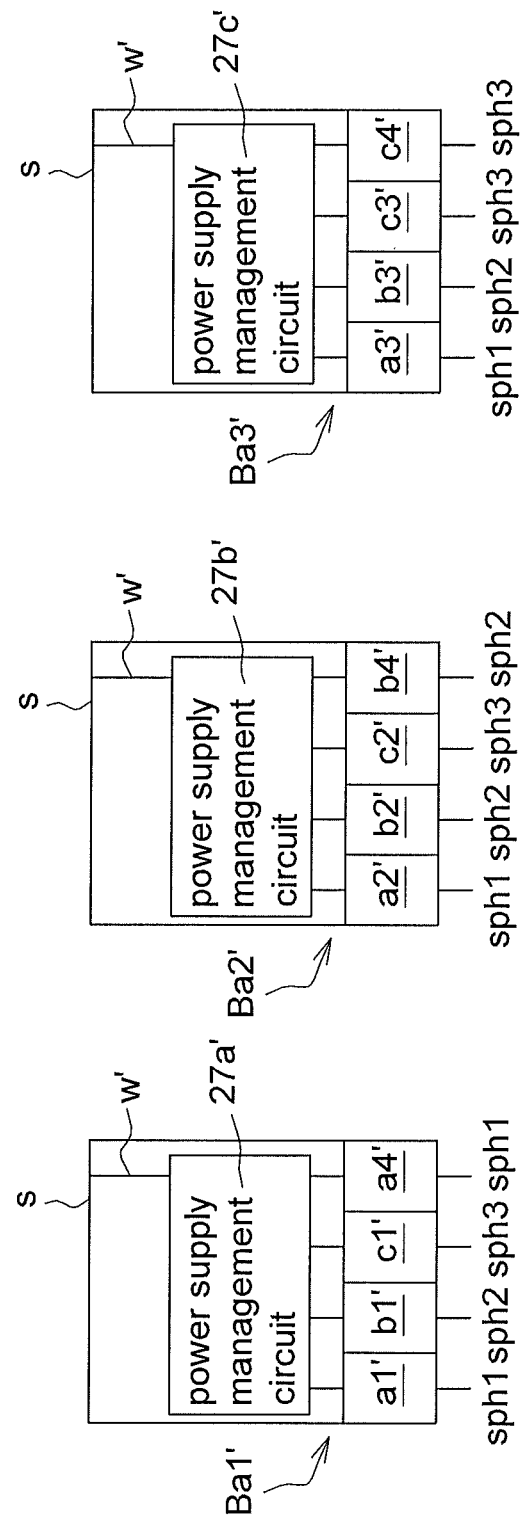

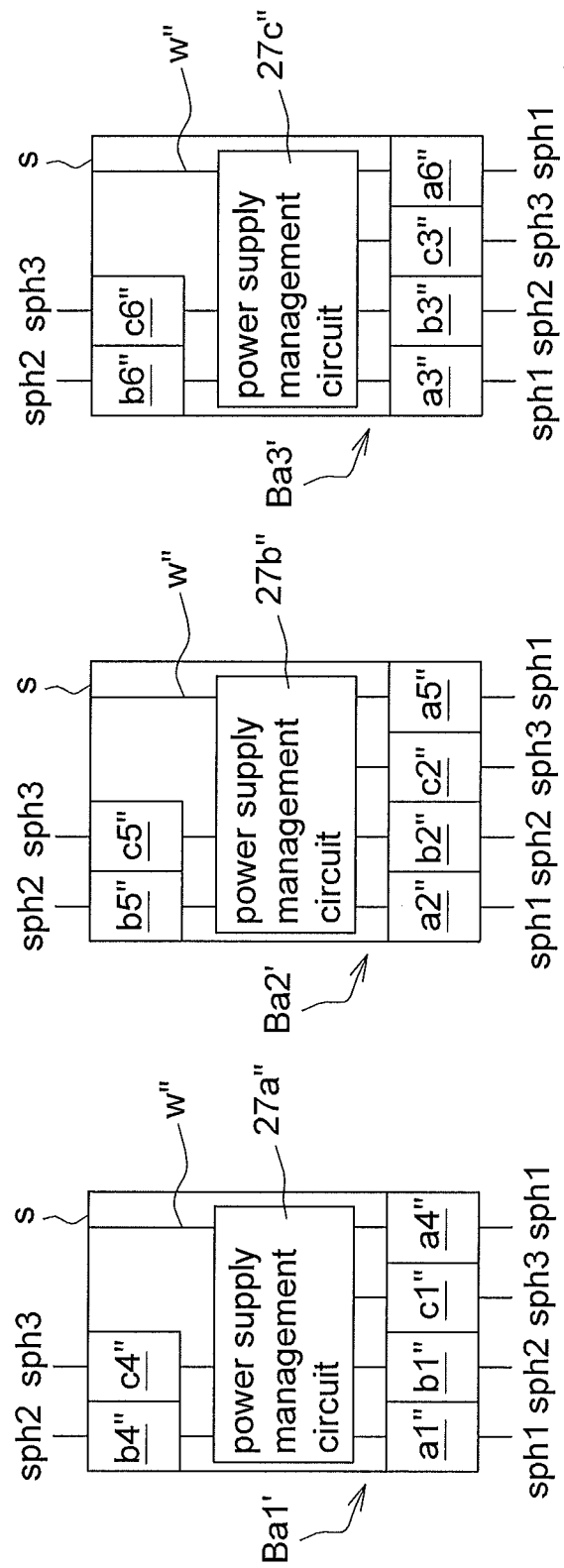

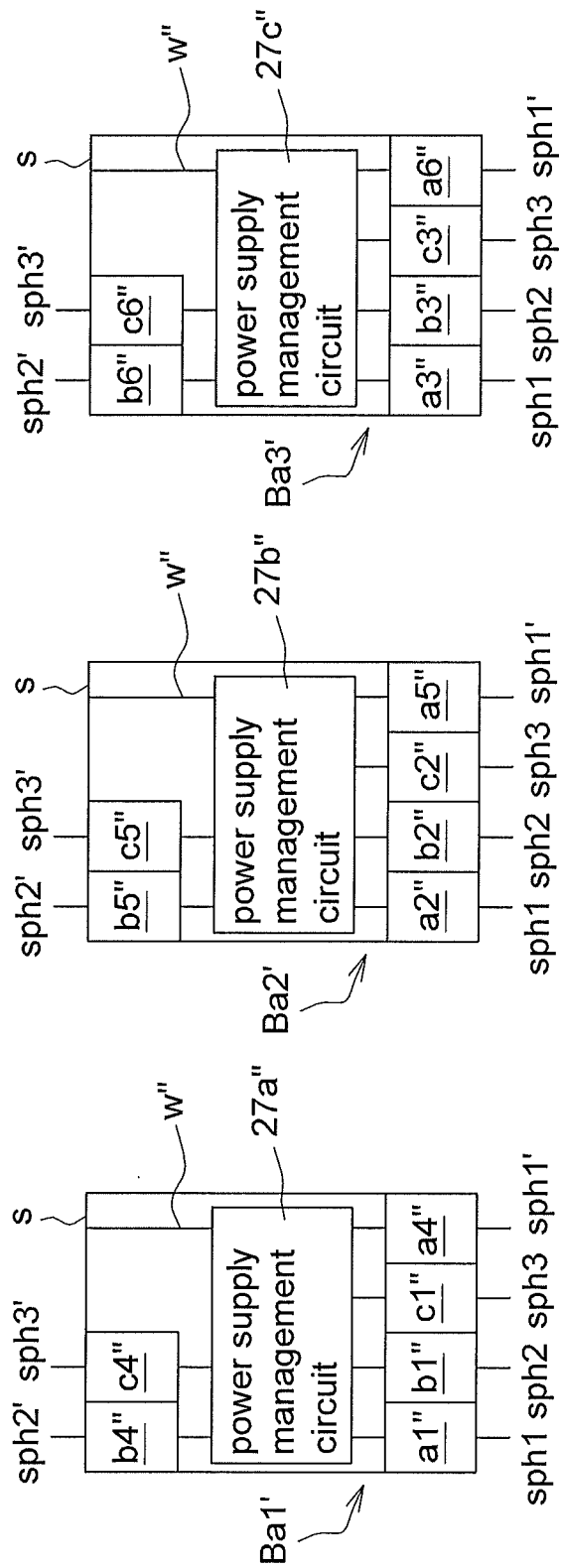

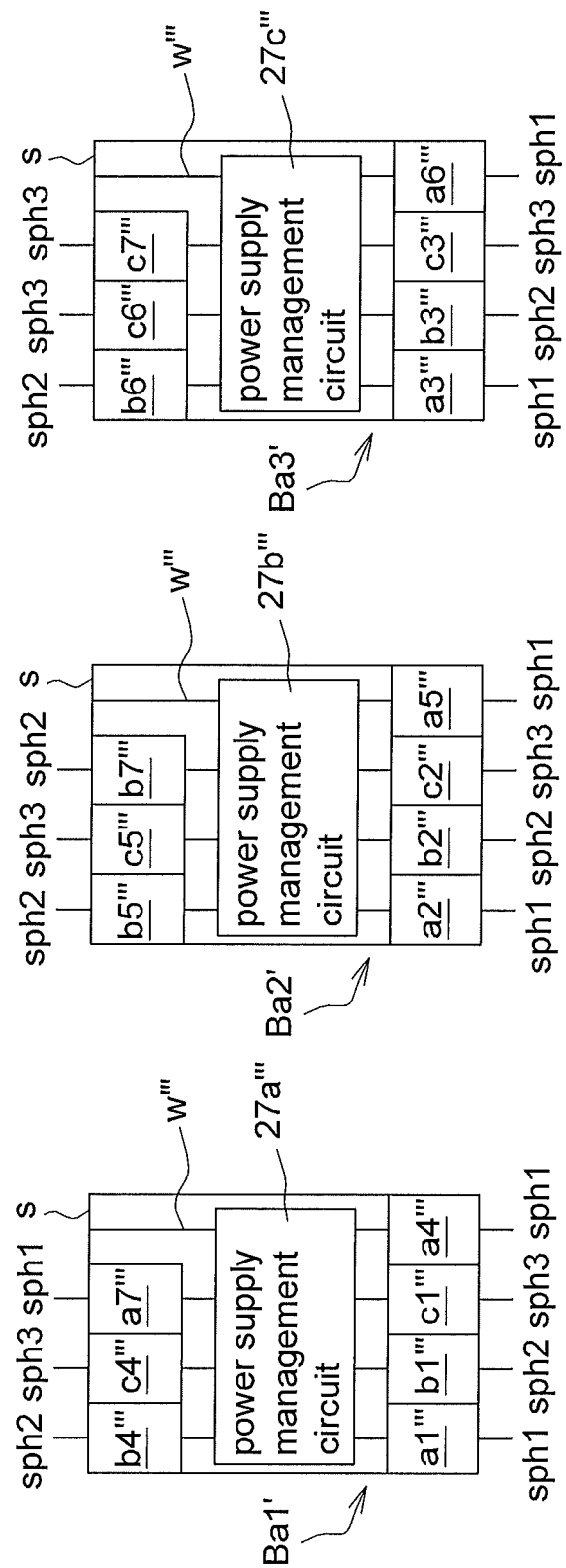

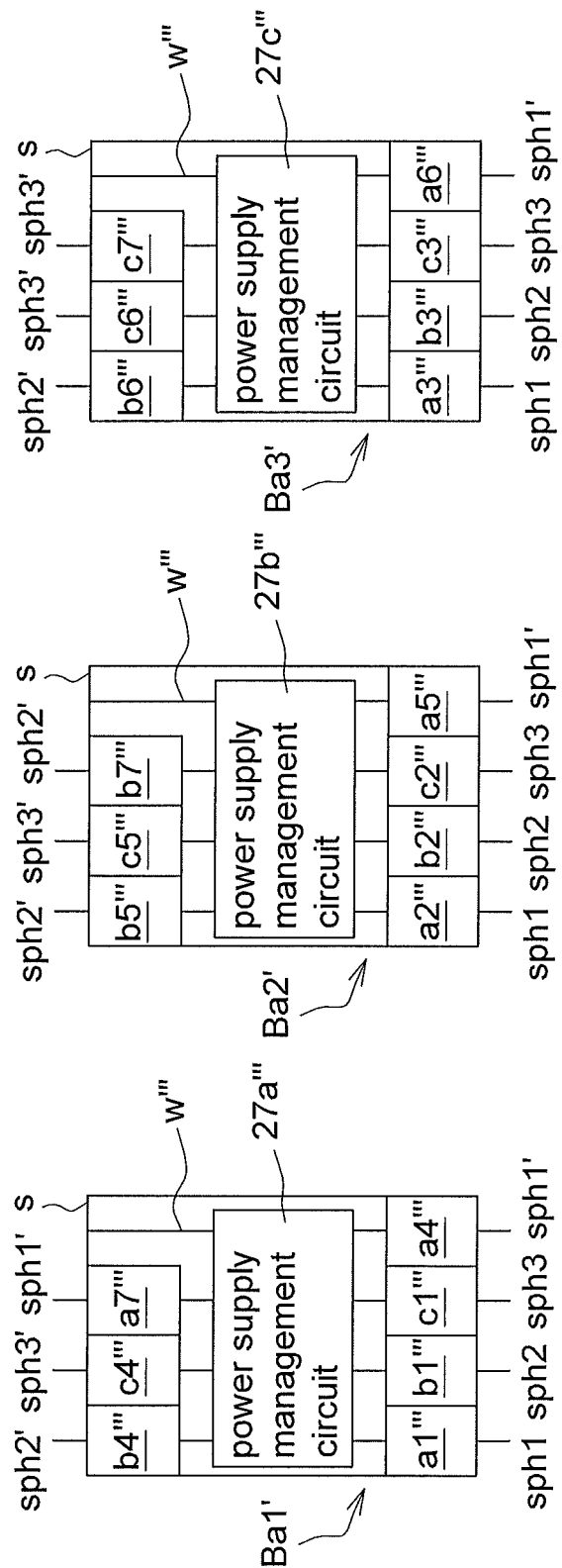

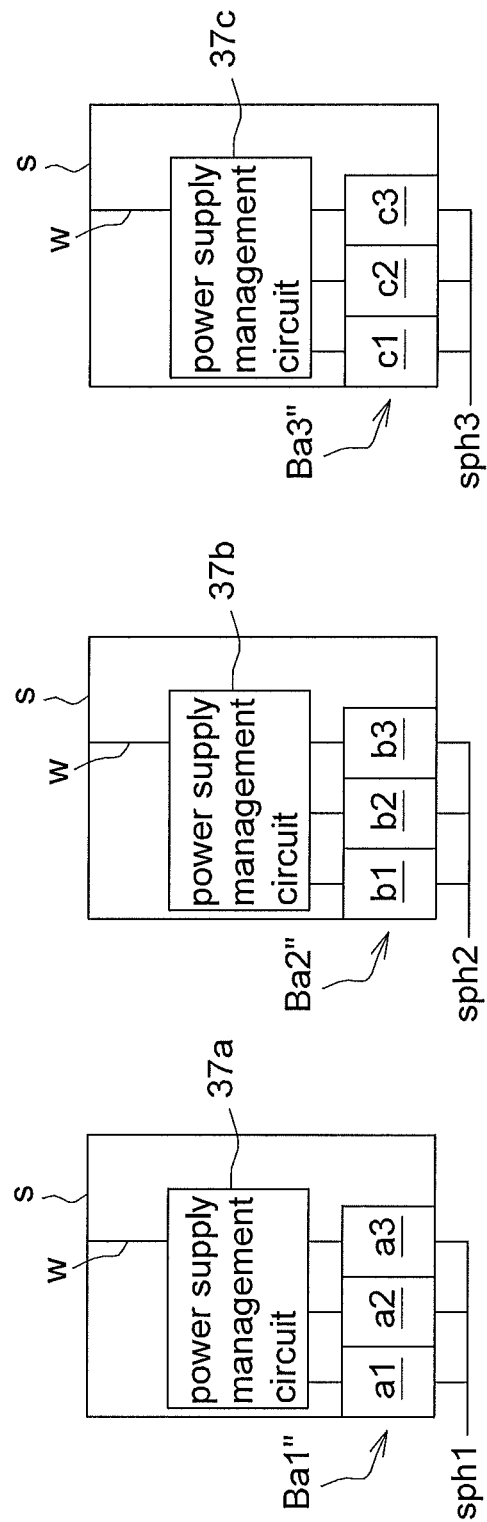

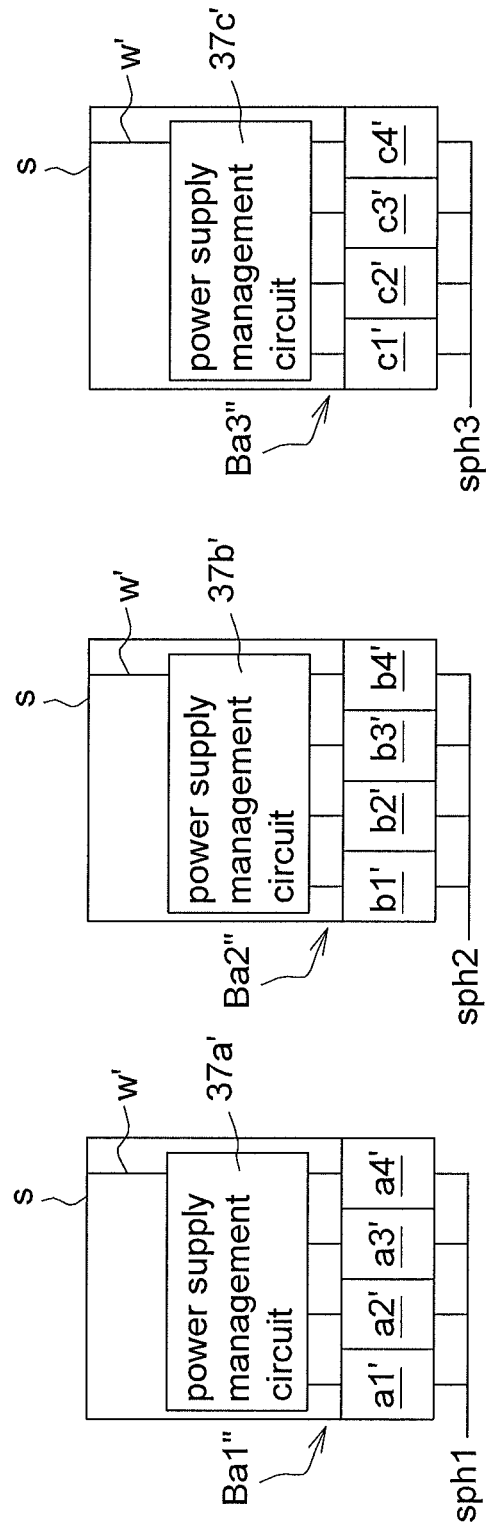

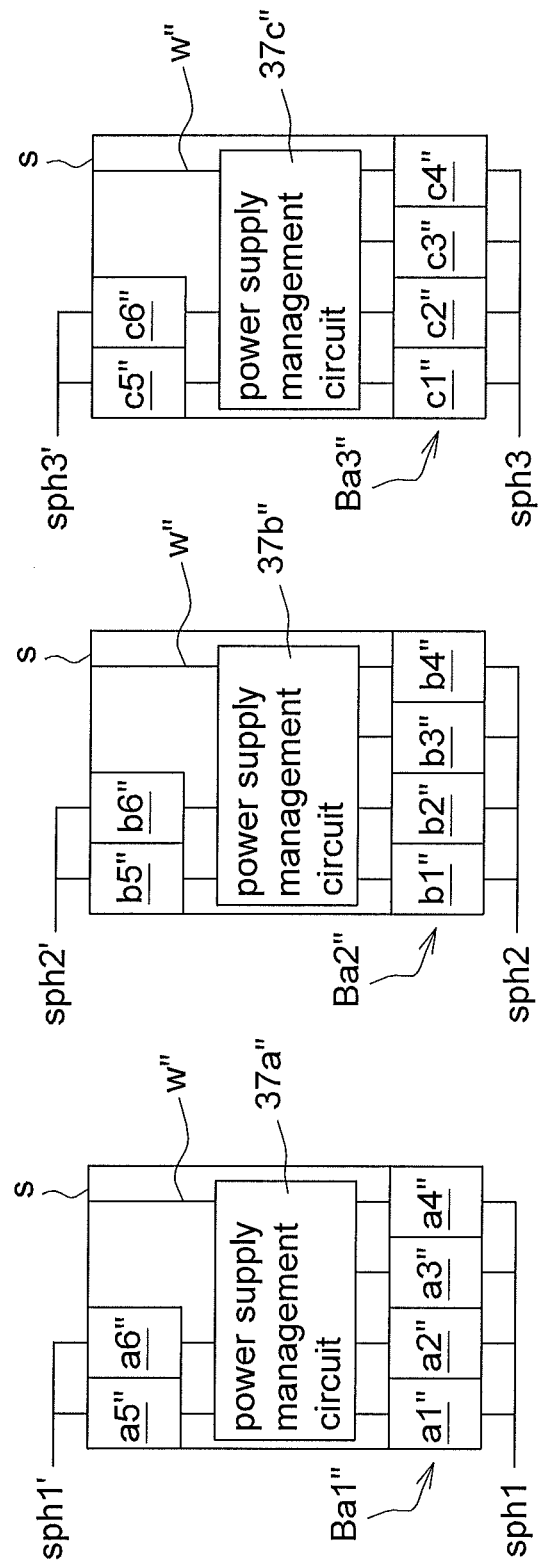

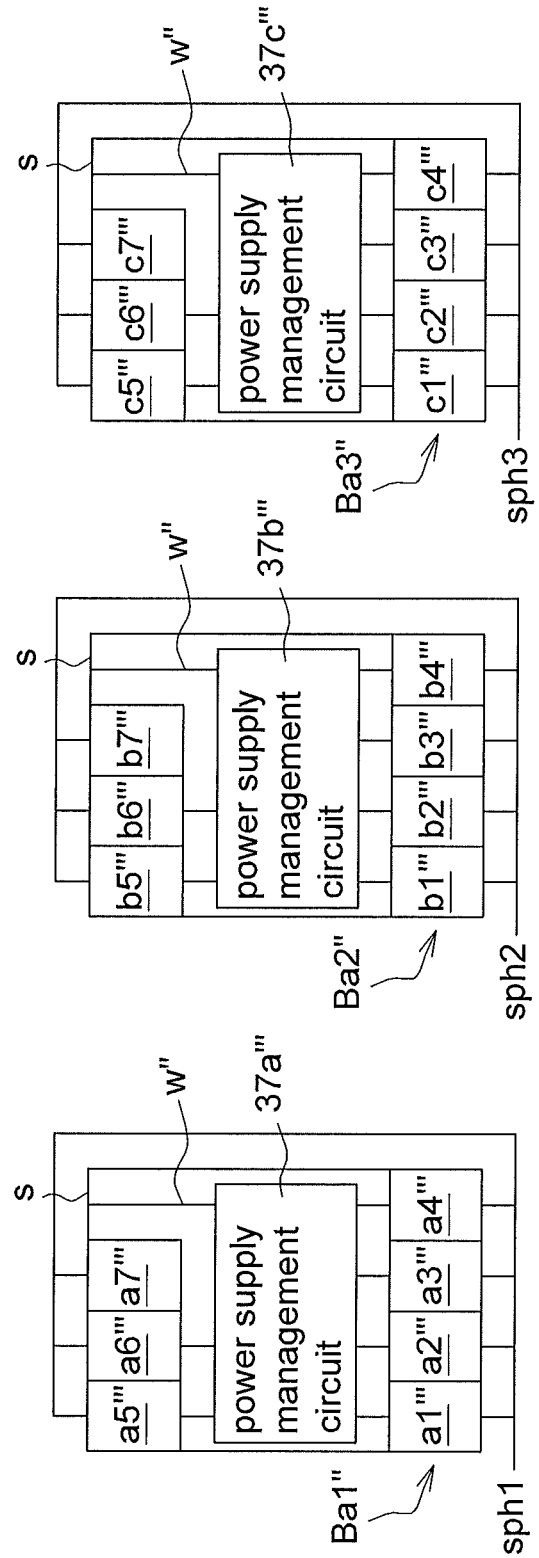

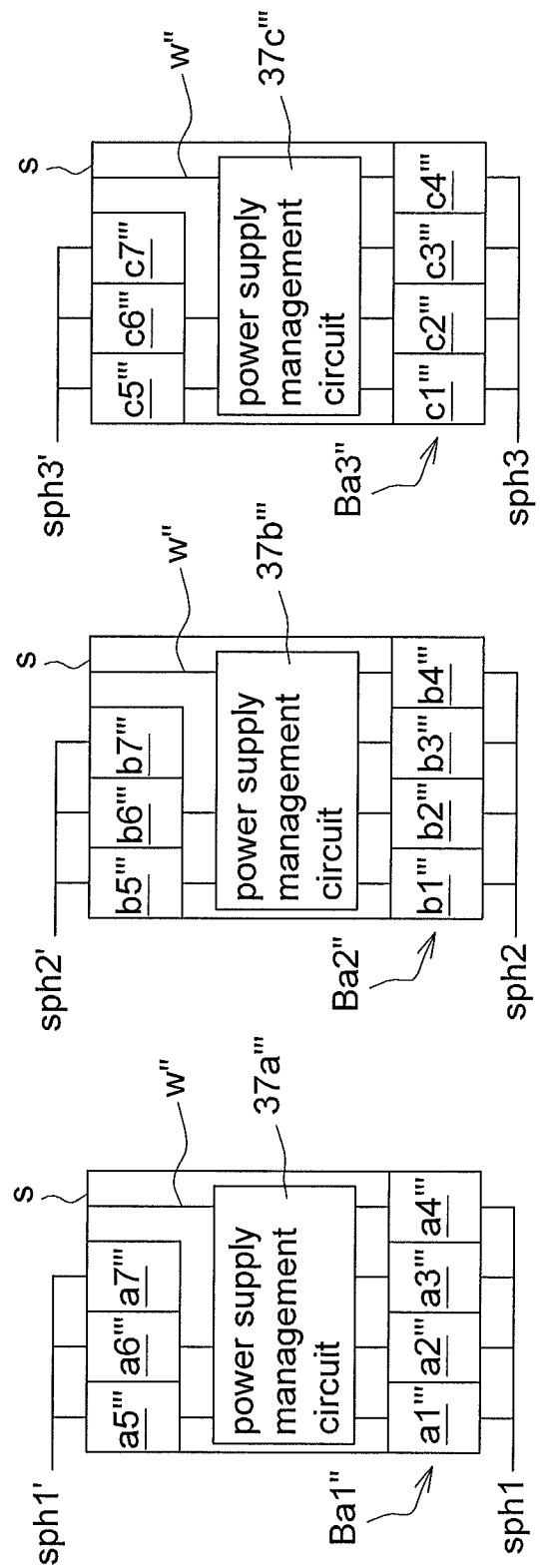

ial patent application Ser. No. 12/971,218,
SERVER RACK SYSTEM

This application is a continuation application of U.S. Non-Provisional patent application Ser. No. 12/971,218, filed on Dec. 17, 2010 and entitled "SERVER RACK SYSTEM", which claims priority to Taiwan Application No. 099118620 and 099121569, which were respectively filed Jun. 8, 2010 and Jun. 30, 2010, the contents of which are herein incorporated by reference in their entirety.

BACKGROUND OF THE INVENTION

Field of the Invention

The invention relates in general to a server rack system, and more particularly to a server rack system which operates in response to a three-phase alternating current (AC) power signal.

Description of the Related Art

Blade servers have already been widely used in many areas. In general, blade servers are disposed in the manner of a server rack system, so that a number of blade servers are assembled together in a server rack system and the operations of the blade servers are made much more convenient to the user.

Along with the increase in the number of servers in a server rack system, the power of the power source signals required for maintaining the normal operation of all servers in the server rack system also needs to be increased accordingly. Of the existing technologies, the three-phase power source signal is often used to drive the server rack system, so as to increase the driving capacity of the power source signal per unit time.

However, in the three-phase power supply network, the reference ground level may easily shift if the power supply currents on the power supply paths of the three phases are imbalanced due to the loadings on the power supply paths being imbalanced. Thus, how to provide a server rack system with effectively balanced loading on the power supply path of each phase has thus become a prominent task for the industries.

SUMMARY OF THE INVENTION

The invention is directed to a server rack system which includes a voltage converter for converting a three-phase alternating current (AC) power signal into three single-phase power signals. The server rack system of the invention further provides power to partial server units of the server rack system by a single-phase power supply circuit according to a corresponding single-phase power signal. By balancing the number of the single-phase power supply circuits for each of the single-phase power signals and the number of the server units driven thereby, the server rack system of the invention thus has the loading on the three-phase power supply network balanced. In comparison to a conventional server rack system, the server rack system of the invention has the advantage of avoiding the reference ground level of the three-phase power supply network being shifted due to the imbalance of power supply current occurring to the power supply path of each phase.

According to a first aspect of the present invention, a server rack system including a number of server units, a voltage converter, a first set to a third set of power supply circuits is provided. A number of server units include first to third sets of server units. The voltage converter receives and converts a three-phase alternating current (AC) power signal to provide first to third single-phase power signals, wherein the phase difference between any two of the first to the third single-phase power signals is 120 degrees. The first to the third sets of power supply circuits respectively generate first to third direct current (DC) power signals according to the first to the third single-phase power signals, wherein the first to the third sets of server units are respectively powered by the first to the third DC power signals, or respectively powered by the first to the third parts of the first to the third DC power signals.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIGS. 2A to 2D are schematic diagrams showing a plan of space distribution of the server rack system of FIG. 1;

FIGS. 3A to 3D are another set of schematic diagrams and plan of space distribution of a server rack system according to a first embodiment of the invention;

FIGS. 4A to 4F are schematic diagrams showing another plan of space distribution of the server rack system of FIG. 1;

FIGS. 5A to 5F are schematic diagrams showing yet another plan of space distribution of the server rack system of FIG. 1;

FIGS. 6A to 6D are a set of schematic diagrams and plan of space distribution of a server rack system according to a second embodiment of the invention;

FIGS. 7A to 7D are another set of schematic diagrams and plan of space distribution of a server rack system according to a second embodiment of the invention;

FIGS. 8A to 8F are schematic diagrams showing another plan of space distribution of the server rack system of FIG. 6;

FIGS. 9A to 9F are schematic diagrams showing yet another plan of space distribution of the server rack system of FIG. 6;

FIGS. 10A to 10D are a set of schematic diagrams and plan of space distribution of a server rack system according to a third embodiment of the invention;

FIGS. 11A to 11C are schematic diagrams showing another plan of space distribution of the server rack system of FIG. 10;

FIGS. 12A to 12F are schematic diagrams showing yet another plan of space distribution of the server rack system of FIG. 10;

FIGS. 13A to 13F are schematic diagrams showing yet another plan of space distribution of the server rack system of FIG. 6.

DETAILED DESCRIPTION OF THE INVENTION

First Embodiment

Figure 1:
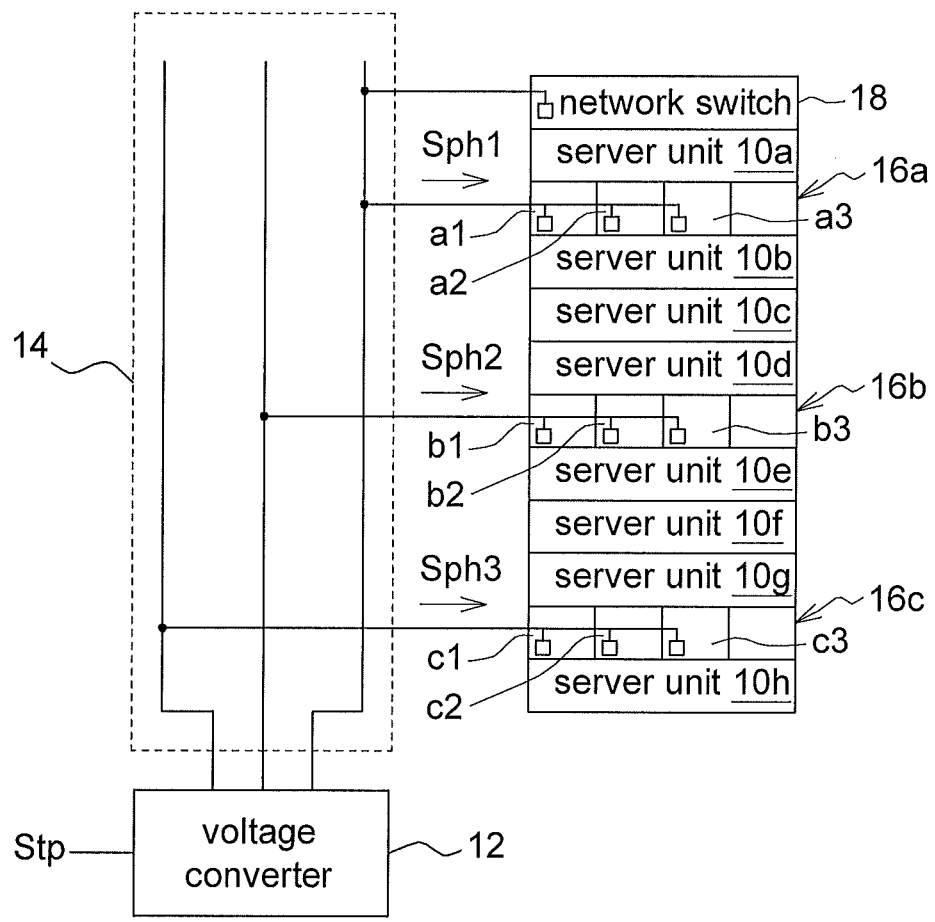
FIG. 1 is a schematic diagram of a server rack system according to a first embodiment of the invention.

Referring to FIG. 1, a schematic diagram of a server rack system according to a first embodiment of the invention is shown. The server rack system 1 includes a number of server units 10a, 10b, 10c, 10d, 10e, 10f, 10g, 10h, a voltage converter 12 and a power supply circuits. For example, each of the server units 10a to 10h includes four server systems. The server units 10a to 10h are divided into first to third sets of server units, wherein the first set of server units includes server units 10a and 10b, the second set of server units includes server units 10c, 10d and 10e, and the third set of server units includes server units 10f, 10g and 10h.

The voltage converter 12 receives and converts a three-phase alternating current (AC) power signal Stp into single-phase power signals Sph1, Sph2 and Sph3. For example, the three-phase AC power signal Stp is an AC wall outlet power signal whose relative voltage is 480 or 380V, and the phase difference between any two of the three single-phase power signals Sph1 to Sph3 obtained through conversion is 120 degrees. The single-phase power signals Sph1 to Sph3 generated by the voltage converter 12 are provided to the power supply circuit through a three-phase AC cable 14.

The power supply circuits include a first set of power supply circuits 16a, a second set of power supply circuits 16b and a third set of power supply circuits 16c, wherein each of the first to the third sets of power supply circuits 16a to 16c includes N power supply circuits arranged in parallel, and N is a natural number. For example, the value of N is related to the power output of the power supply circuits and the power demand of the server units driven by the power supply circuit. In an example of practical operation, the first to the third sets of power supply circuits 16a to 16c at most drive three server units (for example, the third set of power supply circuits 16c drives the server units 10f, 10g and 10h); the power demand for each server unit under normal operation is 2900 W; and the power output of each power supply circuit is 2900 W. In the present example, N is exemplified by 3; the first set of power supply circuits 16a includes power supply circuits a1, a2 and a3; the second set of power supply circuits 16b includes power supply circuits b1, b2 and b3; and the third set of power supply circuits 16c includes power supply circuits c1, c2 and c3.

The first set of power supply circuits 16a generates a first direct current (DC) power signal according to the single-phase power signal Sph1. The second set of power supply circuits 16b generates a second DC power signal according to single-phase power signal Sph2. The third set of power supply circuits 16c generates a third DC power signal according to single-phase power signal Sph3. In an example, the first set of server units (that is, the server units 10a and 10b), the second set of server units (that is, the server units 10c, 10d and 10e) and the third set of server units (that is, the server units 10f, 10g and 10h) are respectively powered by the first, the second and the third DC power signal.

In an example, the server rack system 1 further includes a network switch 18 driven by the single-phase power signal Sph1. Thus, through the single-phase power signal Sph1 which provides power to the network switch 18, the loading of the single-phase power signal Sph1 is increased, so that the loading of the single-phase power signal Sph1 is close to that of the single-phase power signals Sph2 and Sph3.

Figure 2A:
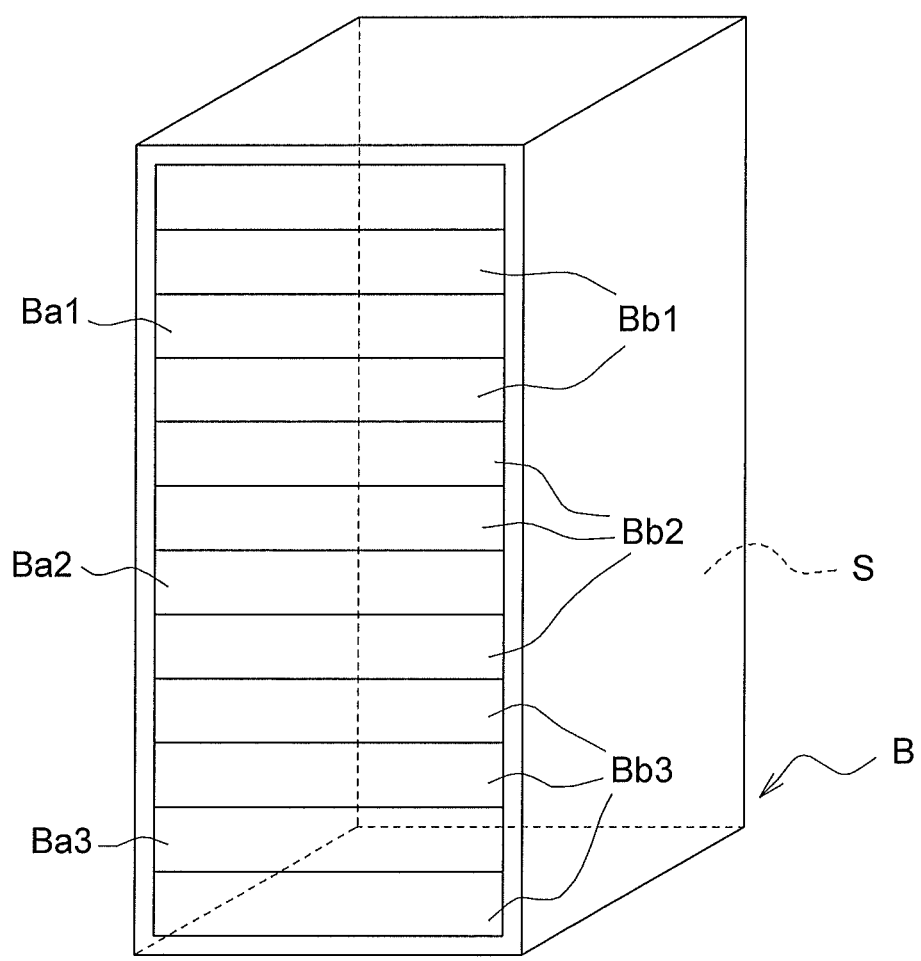

The first to the third sets of power supply circuits 16a to 16c are respectively adjacent to the first to the third sets of server units driven the first to the third sets of power supply circuits 16a to 16c. The first to the third sets of power supply circuits 16a to 16c are respectively electrically connected to the server units driven by the first to the third sets of power supply circuits 16a to 16c through corresponding power supply wires. For example, the server rack system 1 includes a rack body B having power supply circuit accommodation spaces Ba1, Ba2 and Ba3 and server accommodation spaces Bb1, Bb2 and Bb3 as indicated in FIG. 2A.

The power supply circuit accommodation space Ba1, which accommodates the first set of power supply circuits 16a and the server accommodation space Bb1 which, accommodates the first set of server units (that is, the server units 10a and 10b) are adjacent to each other and are connected through a power supply wire, wherein the power supply wire can be realized by a copper bus bar. In an example, the power supply wire is disposed on the back surface S of the server rack system 1 and is connected to the power supply circuits a1 to a3 and server units 10a, 10b through a hot plug interface. Thus, when any of the server units 10a and 10b is damaged, the user can replace the damaged element by way of hot plugging.

For example, a top view of a power supply circuit accommodation space Ba1 is illustrated in FIG. 2B, wherein the power supply circuits a1 to a3 generates and provides a DC power signal to a power supply management circuit 17a, which manages the power supply operation of N power supply circuits a1 to a3 of the first set of power supply circuits 16a, so as to control the output power of each power supply circuit of the first set of power supply circuits 16a. Through the wire W, the power supply management circuit 17a further provides a managed DC power signal to the copper bus bar disposed on the back surface S. The power supply management circuit 17a is connected to each of the power supply circuits a1 to a3 of the first set of power supply circuits 16a through a hot plug interface. Thus, when any of the power supply circuits a1 to a3 is damaged, the user can replace the damaged element by way of hot plugging.

Likewise, in the server rack system 1, the power supply circuit accommodation space Ba2, which accommodates the second set of power supply circuits 16b and the server accommodation space Bb1, which accommodates the second set of server units (that is, server units 10c to 10e) are adjacent to each other and are connected through a power supply wire. The power supply circuit accommodation space Ba3, which accommodates the third set of power supply circuits 16c and the server accommodation space Bb3, which accommodates the third set of server units (that is, server units 10f to 10h) are adjacent to each other and are connected through a power supply wire. Top view of the power supply circuit accommodation spaces Ba2 and Ba3, which accommodate the second set and the third set of power supply circuits 16b and 16c are respectively illustrated in FIGS. 2C and 2D.

Figure 3A:
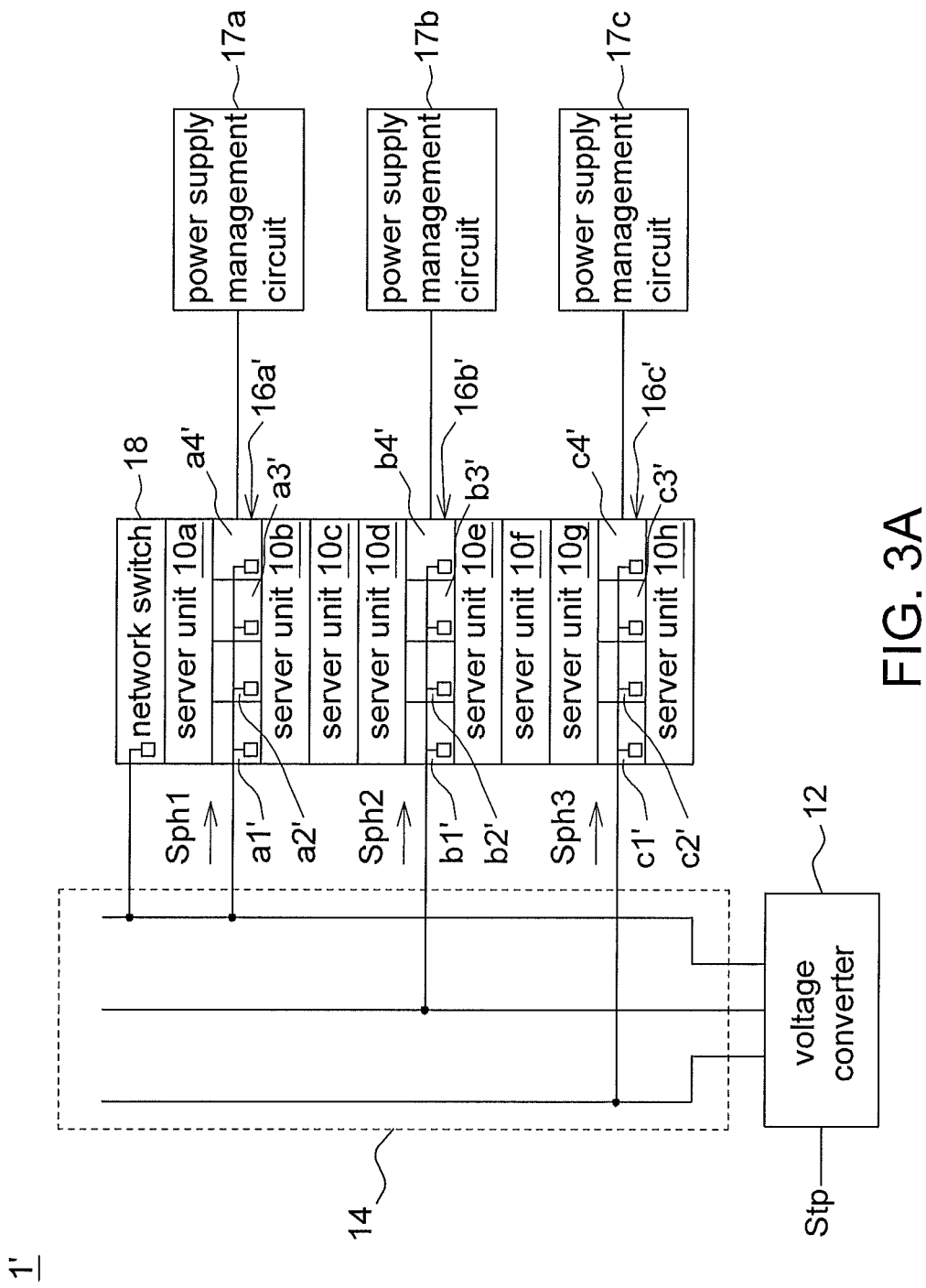
Figure 6A:
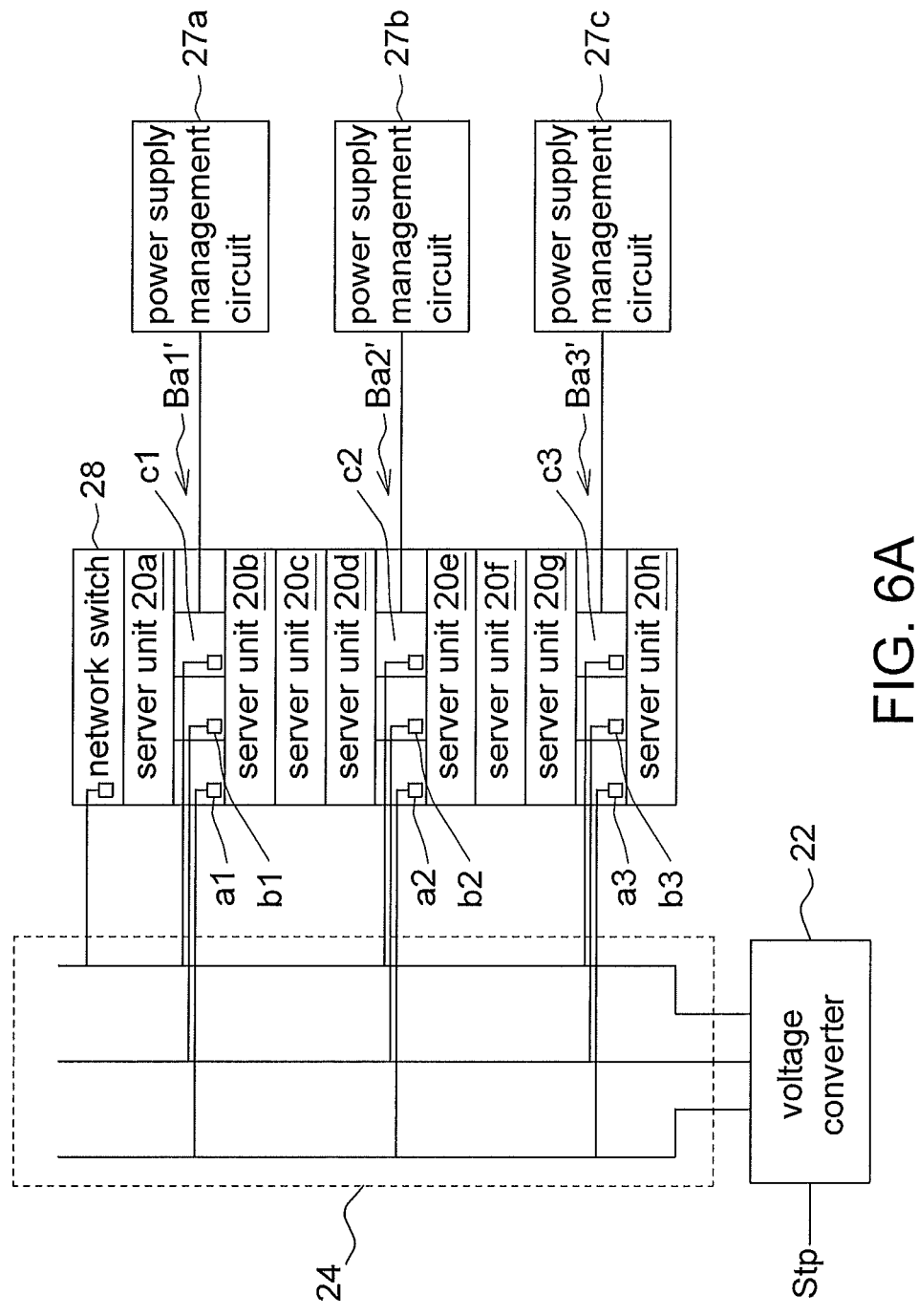
Figure 7A:
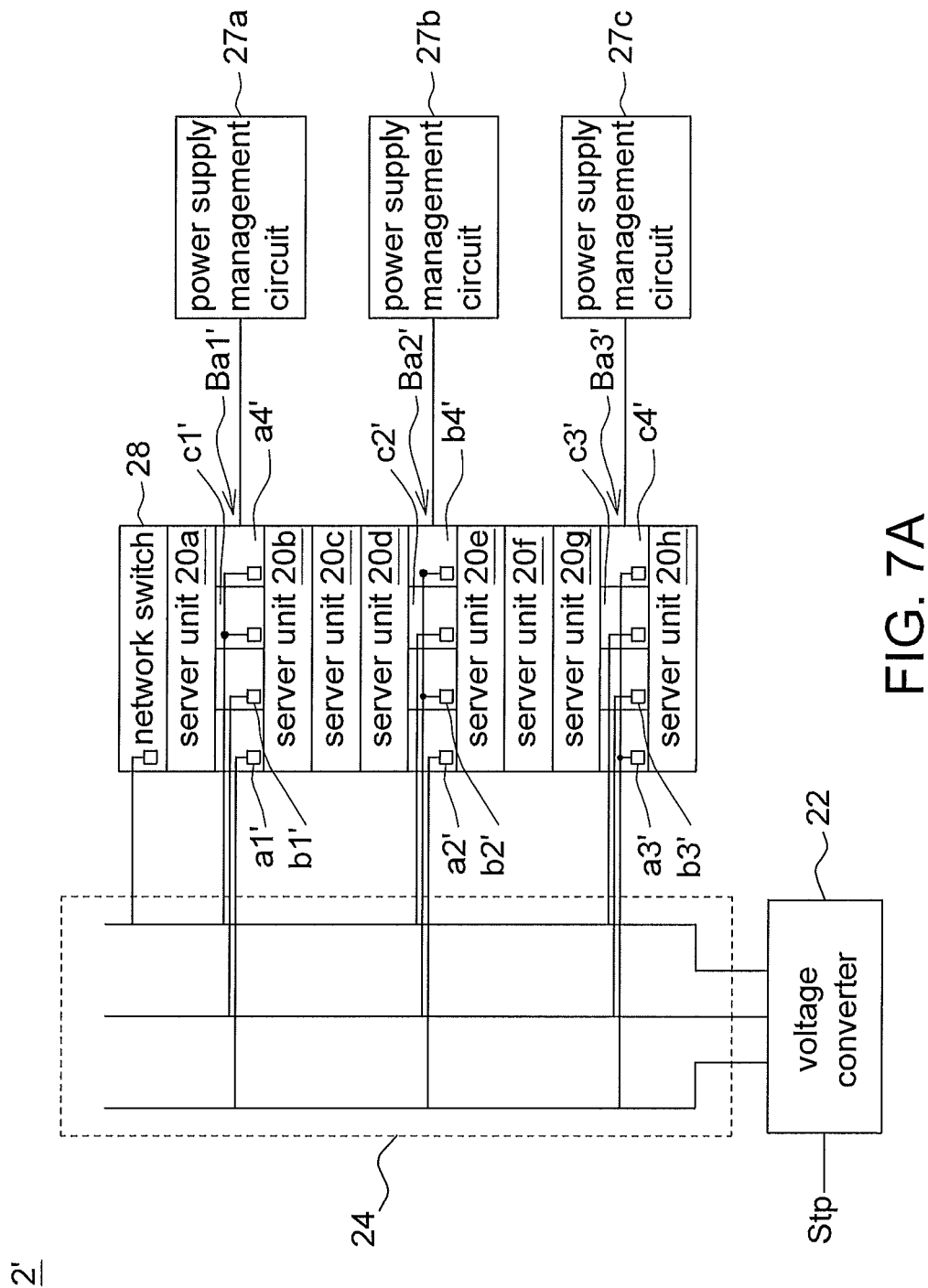
Figure 10A:
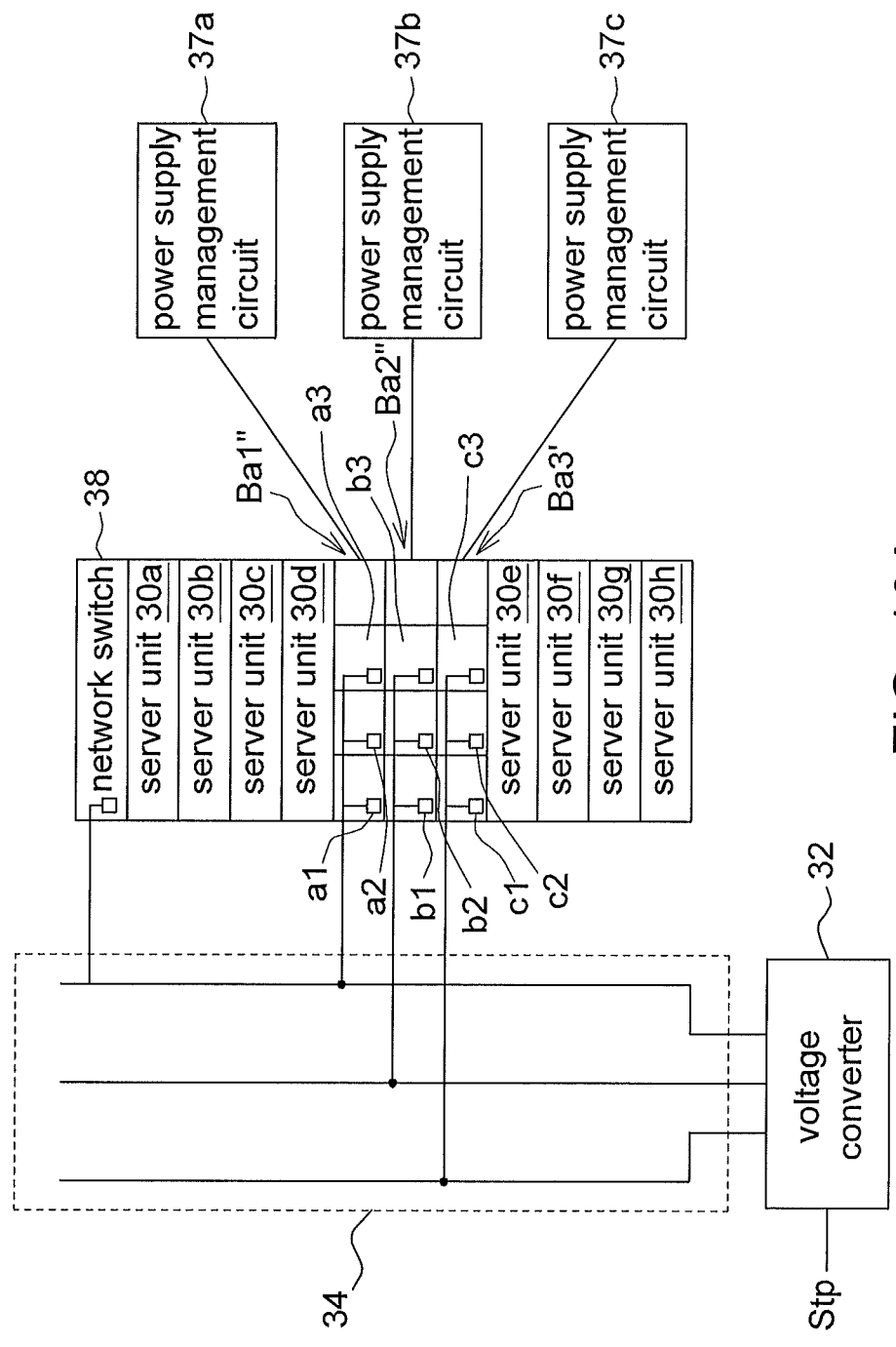
Figures 12A, 12B, 12C:
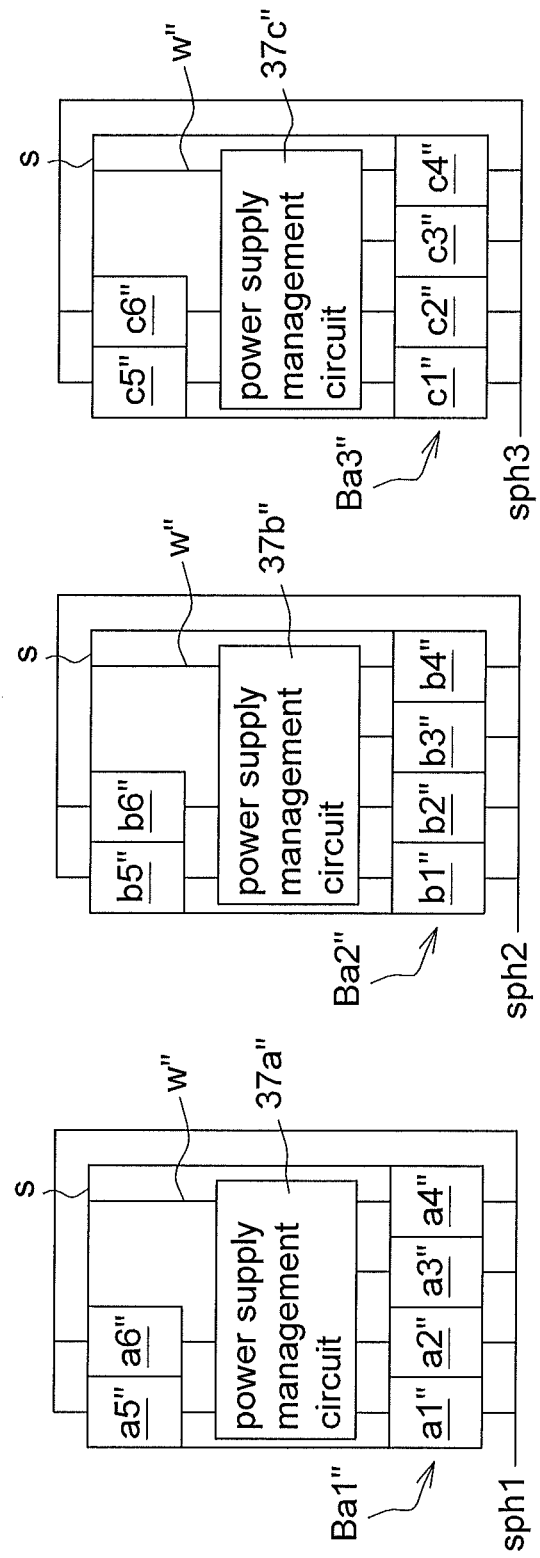

In the present embodiment of the invention, each of the first to the third sets of power supply circuits 16a to 16c includes N power supply circuits, but the invention is not limited thereto. In an example as indicated in FIG. 3A, the first to the third sets of power supply circuits 16a' to 16c' respectively include redundant power supply circuits a4', b4' and c4' in addition to N power supply circuits. In other words, each of the first to the third sets of power supply circuits 16a' to 16c' includes N+1 (that is, 4) power supply circuits. In an example, the four power supply circuits are arranged side by side and the width of the four the four power supply circuits arranged together is close to that of a server unit. Top views of the power supply circuit accommodation spaces Ba1, Ba2 and Ba3 are respectively illustrated in FIGS. 3B to 3D.

The power supply circuits a1' to a4', b1' to b4' and c1' to c4' respectively generate and provide a DC power signal to a power supply management circuit 17a' which manages the power supply operation of N+1 power supply circuits a1' to a4' of the first set of power supply circuits 16a'. Through the wire W', the power supply management circuit 17a' further provides a managed DC power signal to the copper bus bar disposed on the back surface S. Likewise, the server rack system 1' further includes power supply management circuits 17b' and 17c', which respectively manage the power supply operation of N+1 power supply circuits of the second and the third sets of power supply circuits 16b' and 16c'. Since the operations of the power supply management circuits 17a' to 17c' are similar, a number of examples of operation below are exemplified by the power supply management circuit 17c'.

The power supply management circuit 17c' detects whether the N+1 power supply circuits of the third set of power supply circuits 16c' are operated in a normal state. If so, the power supply management circuit 17c' controls the total output of the N+1 power supply circuits of the third set of power supply circuits 16c' to be corresponding to the power demand of the third set of server units. For example, the power demand of the third set of server units is 8700 W (=2900 W×N; N=3), and the power supply management circuit 17c' controls the four (=N+1) power supply circuits of the third set of power supply circuits 16c' to generate 8700 W of DC power signals. Meanwhile, each the four power supply circuits of the third set of power supply circuits 16c' provides 2175 W of DC power signals.

If the power supply management circuit 17c' detects that any of the N+1 power supply circuits of the third set of power supply circuits 16c' is operated in an abnormal state, the power supply management circuit 17c' turns off the abnormal power supply circuit and controls the remaining three power supply circuits to provide 8700 W of DC power signals, so that the operation of the third set of server units will not terminate when a power supply circuit of the third set of power supply circuits 16c' is abnormal. Meanwhile, the power supply management circuit 17c' further triggers an abnormality event to inform the user that the power supply circuit of the third set of power supply circuits 16c' is operated in an abnormal state.

In another example as indicated in FIGS. 4A to 4C, the first to the third sets of power supply circuits respectively include redundant power supply circuits a4'', a5'' and a6'', b4'', b5'' and b6'', and c4'', c5'' and c6'' in addition to N power supply circuits. In yet another example as indicated in FIGS. 5 A to 5C, the first to the third sets of power supply circuits respectively include redundant power supply circuits a4''', a5''', a6''' and a7''', b4''', b5''', b6''' and b7''', and c4''', c5''', C6''' and c7''' in addition to N power supply circuits.

In the present embodiment of the invention, the server rack system 1 is powered by a three-phase AC power signal Stp, but the invention is not limited thereto. The server rack system 1 of the present embodiment of the invention can also be powered by two or more than two three-phase AC power signals. For example, the server rack system of the present embodiment of the invention is powered by two three-phase AC power signals. Each set of power supply circuits has N power supply circuits and three redundant power supply circuits. In the first set of power supply circuits, the power supply circuits a1'', a2'', a3'' and the redundant power supply circuits a4'' which are located in the front row are powered by the single-phase power signal Sph1 corresponding to the first three-phase AC power signal, and the redundant power supply circuits a5'' and a6'' located in the rear row are powered by a single-phase power signal Sph1' corresponding to the second three-phase AC power signal as indicated in FIG. 4D. Like the disposition of the first set of power supply circuits disclosed above, the second set and the third set of power supply circuits can also be disposed in a similar way as illustrated in FIGS. 4E and 4F. The first and the second three-phase AC power signals can be provided by different power substations.

In another example as indicated in FIG. 5D, each set of power supply circuits such as has N power supply circuits and four redundant power supply circuits; the power supply circuits a1''', a2''' and a3''' of the first set of power supply circuits are powered by a single-phase power signal Sph1 corresponding to the first three-phase AC power signal; the redundant power supply circuits a4''', a5''', a6''', a7''' are powered by a single-phase power signal Sph1' corresponding to the second three-phase AC power signal. Like the disposition of the first set of power supply circuits disclosed above, the second set and the third set of power supply circuits can be disposed in a similar way as illustrated in FIGS. 5E and 5F.

In the server rack system of the present embodiment of the invention, the power supply paths of the three single-phase power signals substantially have the same number of power supply circuits for driving the loading of similar magnitudes. Thus, the server rack system of the present embodiment of the invention can effectively have the loadings on the single-phase power signals balanced, so that the three-phase power supply network has a balanced power supply current and a stable reference ground level.

Second Embodiment

In the server rack system of the present embodiment of the invention, each of the first to the third sets of power supply circuits is uniformly distributed in a number of the power supply circuit accommodation space of the rack body. Referring to FIG. 6A to 6D, a set of schematic diagrams and plan of space distribution of a server rack system according to a second embodiment of the invention is shown. Unlike the server rack system 1 of the first embodiment, in the server rack system 2 of the present embodiment of the invention, the power supply circuits a1, a2 and a3 driven by the single-phase power signal Sph1 are respectively disposed in the power supply circuit accommodation space Ba1', Ba2' and Ba3'; the power supply circuits b1, b2 and b3 driven by the single-phase power signal Sph2 are respectively disposed in the power supply circuit accommodation space Ba1', Ba2' and Ba3'; the power supply circuits c1, c2 and c3 driven by the single-phase power signal Sph3 are respectively disposed in the power supply circuit accommodation space Ba1', Ba2' and Ba3'.

In other words, the N power supply circuits corresponding to the single-phase power signal Sph1, the N power supply circuits corresponding to the single-phase power signal Sph2 and the N power supply circuits corresponding to the single-phase power signal Sph3 are respectively uniformly distributed in the three power supply circuit accommodation space Ba1', Ba2' and Ba3', so that in each of the power supply circuit accommodation spaces Ba1', Ba2' and Ba3', the number of the power supply circuits corresponding to the single-phase power signal Sph1, the number of the power supply circuits corresponding to the single-phase power signal Sph2 and the number of the power supply circuits corresponding to the single-phase power signal Sph3 are substantially the same.

Through the control of the power supply management circuit 27a, 27b and 27c, in the server rack system 2 of the present embodiment of the invention, the DC power signals of the power supply circuits of the power supply circuit accommodation spaces Ba1' to Ba3' corresponding to the single-phase power signals Sph1 to Sph3 substantially have the same magnitude of power. Thus, the server rack system 2 of the present embodiment of the invention 2 assures that the loadings on the power supply paths of the single-phase power signals Sph1, Sph2 and Sph3 have similar magnitudes, so that the three-phase power supply network has a balanced power supply current and a stable reference ground level.

Like the first embodiment, in the present embodiment of the invention, each of the power supply circuit accommodation spaces Ba1' to Ba3' can have one or more than one redundant power supply circuit as indicated in FIGS. 7A to 7D, FIGS. 8A to 8F and FIGS. 9A to 9F.

In the examples illustrated in FIGS. 7A to 7D, the power supply circuit accommodation space Ba1' further includes a power supply circuits a4' in addition to the power supply circuits a1', b1', c1'; the power supply circuit accommodation space Ba2' further includes a power supply circuits b4' in addition to the power supply circuits a2', b2', c2'; the power supply circuit accommodation space Ba3' further includes a power supply circuits c4' in addition to the power supply circuits a3', b3', c3'. Through the disposition as illustrated in FIGS. 7A to 7D, the server rack system 2 of the present embodiment of the invention assures that the loadings on the power supply paths of the single-phase power signals Sph1, Sph2 and Sph3 have similar magnitudes, so that the three-phase power supply network has a balanced power supply current and a stable reference ground level.

Likewise, in the examples illustrated in FIGS. 8A to 8F, the power supply circuit accommodation space Ba1' further includes three power supply circuits a4", b4", c4" in addition to the power supply circuits a1", b1", c1"; the power supply circuit accommodation space Ba2' further includes three power supply circuits a5", b5", c5" in addition to the power supply circuits a2", b2", c2"; the power supply circuit accommodation space Ba3' further includes three power supply circuits a6", b6", c6" in addition to the power supply circuits a3", b3", c3". In the examples illustrated in FIG. 8A to 8C, power supply circuits a1"-a6", b1"-b6" and c1"-c6" are powered by the single-phase power signals Sph1 to Sph3 converted from the same three-phase AC power signal. In the examples illustrated in FIGS. 8D to 8F, the first to the third sets of power supply circuits are powered by the single-phase power signals Sph1 to Sph3 corresponding to the first three-phase AC power signal and the single-phase power signal Sph1' to Sph3' corresponding to the second three-phase AC power signal. The power supply of the first to the third sets of power supply circuits is disclosed below in greater details: The power supply circuits a1" to a3" of the first set of power supply circuits are respectively powered by the single-phase power signals Sph1 to Sph3, and the power supply circuits a4" to a6" are respectively powered by the single-phase power signals Sph1' to Sph3. The power supply circuits b1" to b3" of the second set of power supply circuits are respectively powered by the single-phase power signals Sph1 to Sph3, and the power supply circuits b4" to b6" are respectively powered by the single-phase power signals Sph1' to Sph3'. The power supply circuits c1" to c3" of the third set of power supply circuits are respectively powered by the single-phase power signals Sph1 to Sph3, and the power supply circuits c4" to c6" are respectively powered by the single-phase power signals Sph1' to Sph3'.

In the examples illustrated in FIGS. 9A to 9F, the power supply circuit accommodation space Ba1' further includes four power supply circuits a4''', b4''', c4''', a7''' in addition to the power supply circuits a1''', b1''', c1'''; the power supply circuit accommodation space Ba2' further includes four power supply circuits a5''', b5''', c5''', b7''' in addition to the power supply circuits a2''', b2''', c2'''; the power supply circuit accommodation space Ba3' further includes four power supply circuits a6''', b6''', c6''', c7''' in addition to the power supply circuits a3''', b3''', c3'''. In the examples illustrated in FIGS. 9A to 9C, the power supply circuits a1'''-a6''', b1'''-b6''' and c1'''-c6''' are powered by the single-phase power signals Sph1 to Sph3 converted from the same three-phase AC power signal. In the examples illustrated in FIGS. 9D to 9F, the first to the third sets of power supply circuits are powered by the single-phase power signals Sph1 to Sph3 corresponding to the first three-phase AC power signal and the single-phase power signal Sph1' to Sph3' corresponding to the second three-phase AC power signal. The power supply of the first to the third sets of power supply circuits is disclosed below in greater details: The power supply circuits a1''' to a3''' of the first set of power supply circuits are respectively powered by the single-phase power signals Sph1 to Sph3, and the power supply circuits a4''', a5''', a6''' and a7''' are respectively powered by the single-phase power signal Sph1', Sph2', Sph3' and Sph1'. The power supply circuits b1''' to b3''' of the second set of power supply circuits are respectively powered by the single-phase power signals Sph1 to Sph3, and the power supply circuits b4''', b5''', b6''' and b7''' are respectively powered by single-phase power signal Sph1', Sph2', Sph3' and Sph2'. The power supply circuits c1''' to c3''' of the third set of power supply circuits are respectively powered by the single-phase power signals Sph1 to Sph3, and the power supply circuits c4''', c5''', c6''' and c7''' are respectively powered by the single-phase power signals Sph1', Sph2', Sph3' and Sph3'.

In the server rack system of the present embodiment of the invention, the power supply paths of the three single-phase power signals substantially have the same number of power supply circuits for driving the loading of similar magnitudes. Thus, the server rack system of the present embodiment of the invention can effectively have the loadings on the single-phase power signals balanced, so that the three-phase power supply network has a balanced power supply current and a stable reference ground level.

Third Embodiment

In the server rack system of the present embodiment of the invention, the DC power signals provided by the first to the third sets of power supply circuits are connected in parallel for driving all servers of the server rack system. Referring to FIGS. 10A to 10D, a set of schematic diagrams and plan of space distribution of a server rack system according to a third embodiment of the invention is shown. Unlike the server rack systems 1 and 2 of the first and the second embodiment, in the server rack system 3 of the present embodiment of the invention 3, the first to the third sets of power supply circuits are disposed in their adjacent power supply circuit accommodation spaces Ba1", Ba2" and Ba3", and the DC power signals outputted from the first to the third sets of power supply circuits are connected in parallel through a copper bus bar. Thus, the server rack system 3 of the present embodiment of the invention can supply power to all of the server units 30a to 30h of the server rack system 3 with the DC power signals connected in parallel.

The server rack system 3 of the present embodiment of the invention further has power supply management circuits 37a, 37b and 37c, which respectively manage the power supply operation of each power supply circuit of the first to the third sets of power supply circuits 36a to 36c to control the first to the third sets of power supply circuits 36a to 36c to substantially have the same magnitude of output power to have the loading on each of the single-phase power signals balanced, so that the three-phase power supply network has a balanced power supply current and a stable reference ground level.

Like the first and the second embodiments, in the present embodiment of the invention, one or more than one redundant power supply circuit can be further disposed in each of the power supply circuit accommodation spaces Ba1" to Ba3" as indicated in FIGS. 11A to 11C, FIGS. 12A to 12F and FIGS. 13A to 13F. FIGS. 11A to 11C are schematic diagrams showing each of the power supply circuit accommodation spaces Ba1" to Ba3" includes one redundant power supply circuit. FIGS. 12A to 12F are schematic diagrams showing each of the power supply circuit accommodation spaces Ba1" to Ba3" includes three redundant power supply circuits. FIGS. 13A to 13F are schematic diagrams showing each of the power supply circuit accommodation space Ba1" to Ba3" includes four redundant power supply circuits.

In the example illustrated in FIG. 12D. The server rack system of the present embodiment of the invention is powered by two three-phase AC power signals, wherein each set of the power supply circuits, for example, has N power supply circuits and three redundant power supply circuits. The power supply circuits a1", a2", a3" and the redundant power supply circuits a4" which are located in the front row of the first set of power supply circuits are powered by a single-phase power signal Sph1 corresponding to the first three-phase AC power signal, and the redundant power supply circuits a5" and a6" which are located in the rear row are powered by a single-phase power signal Sph1' corresponding to the second three-phase AC power signal. Like the disposition of the first set of power supply circuits, the second set and the third set of power supply circuits can also be disposed in a similar way as illustrated in FIGS. 12E and 12F. The first and the second three-phase AC power signals can be provided by different power substations.

In the examples illustrated in FIG. 13D, each set of power supply circuits, for example, has N power supply circuits and four redundant power supply circuits, wherein the power supply circuits a1''', a2''' and a3''' of the first set of power supply circuits are powered by the single-phase power signal Sph1 corresponding to the first three-phase AC power signal, and the redundant power supply circuits a4''', a5''', a6''', a7''' are powered by the single-phase power signal Sph1' corresponding to the second three-phase AC power signal. Like the disposition of the first set of power supply circuits, the second set and the third set of power supply circuits can also be disposed in a similar way as illustrated in FIGS. 13E and 13F.

In the server rack system of the present embodiment of the invention, the power supply path of each of the three single-phase power signals substantially has the same number of power supply circuits for driving the loadings of similar magnitudes. Thus, the server rack system of the present embodiment of the invention can effectively have the loadings on the single-phase power signals balanced, so that the three-phase power supply network has a balanced power supply current and a stable reference ground level.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A server rack system, comprising:
   N separate power lines, where N is a natural number greater than two;
   a plurality of rows of servers;
   a plurality of rows of power supply circuits, each row including N main power supply circuits and M redundant power supply circuits, where M is a natural number of at least one and less than N;
   each of the N separate power lines being connected to and providing power to, within each row of the power supply circuits, at least one of the N main power supply circuits;
   M of the N separate power lines being connected to and providing power to, within each row of power supply circuits, individual ones of the M redundant power supply circuits, wherein the phase difference between any two of the M separate power lines is 120 degrees; and
   a network switch driven by a first power line of the N separate power lines;
   wherein each of the N separate power lines is connected to and configured to provide power to a substantially equal number of the power supply circuits, within±one power supply circuit.

2. The server rack system of claim 1, wherein the N main power supply circuits in each row of power supply circuits provide power to N sequential rows of the servers.

3. The server rack system of claim 2, wherein at least one of the M redundant power supply circuits in the each row of power supply circuits provides power to the N sequential rows of the servers when at least one of the N main power supply circuits in the corresponding row acts abnormally.

4. The server rack system of claim 1, further comprising:
   each row of power supply circuits including a power supply management circuit configured to, for the power supply circuits in the row:
      monitor a status of the N main power supply circuits;
      shut down, in response to one of the main power supply circuits acting abnormally, an abnormally acting main power supply circuit and activate one of the redundant power supply circuits.

5. The server rack system of claim 1, further comprising a voltage converter configured to convert a three-phase AC power signal into separate single phase AC power signals for the N separate power lines.

6. The server rack system of claim 1, further comprising a network switch;
   N−1 additional rows of servers;
   an additional row of power supply circuits, including N main power supply circuits and M redundant power supply circuits;
   each of the N separate power lines being connected to and providing power to, within the additional row of power supply circuits, at least one of the N main power supply circuits in the additional row;
   M of the N separate power lines being connected to and providing power to, within the additional row of power supply circuits, individual ones of the M redundant power supply circuits in the row;
   wherein the N main power supply circuits of the additional row of power supply circuits provides power to the N−1 additional rows of the servers.

7. The server rack system of claim 1, wherein at least one of the M redundant power supply circuits in the additional row of power supply circuits provides power to the network switch and the N−1 rows of the servers when at least one of the N main power supply circuits in the additional row of power supply circuits acts abnormally.

8. A server rack system, comprising:
N separate power lines, where N is a natural number greater than two;
a plurality of rows of servers;
a plurality of rows of power supply circuits, each row including N main power supply circuits and M redundant power supply circuits, where M is greater than a natural number greater than N;
each of the N separate power lines being connected to and providing power to, within each row of power supply circuits, at least one of the N main power supply circuits and at least one of the M redundant power supply circuits, wherein the phase difference between any two of the N separate power lines is 120 degrees; and
a network switch driven by a first power line of the N separate power lines;
wherein each of the N separate power lines is connected to and configured to provide power to a substantially equal number of the power supply circuits, within±one power supply circuit.

9. The server rack system of claim 8, wherein the N main power supply circuits in each row of power supply circuits provide power to N sequential rows of the servers.

10. The server rack system of claim 8, wherein at least one of the M redundant power supply circuits in the each row of power supply circuits provides power to the N sequential rows of the servers when at least one of the N main power supply circuits in the corresponding row acts abnormally.

11. The server rack system of claim 8, further comprising:
each row of power supply circuits including a power supply management circuit configured to, for the power supply circuits in the row:
monitor a status of the N main power supply circuits;
shut down, in response to one of the main power supply circuits acting abnormally, the abnormally acting main power supply circuit and activate one of the redundant power supply circuits.

12. The server rack system of claim 8, further comprising a voltage converter configured to convert a three-phase AC power signal into separate single phase AC power signals for the N separate power lines.

13. The server rack system of claim 8, further comprising a network switch;
N−1 additional rows of servers;
an additional row of power supply circuits, including N main power supply circuits and M redundant power supply circuits;
each of the N separate power lines being connected to and providing power to, within the additional row of power supply circuits, at least one of the N main power supply circuits in the additional row;
M of the N separate power lines being connected to and providing power to, within the additional row of power supply circuits, individual ones of the M redundant power supply circuits in the row;
wherein the N main power supply circuits of the additional row of power supply circuits provides power to the N−1 additional rows of the servers and the network switch.

14. The server rack system of claim 8, wherein at least one of the M redundant power supply circuits in the additional row of power supply circuits provides power to the network switch and the N−1 rows of the servers when at least one of the N main power supply circuits in the additional row of power supply circuits acts abnormally.

15. A server rack system, comprising:
N separate power lines, where N is a natural number greater than two;
a plurality of rows of servers;
a plurality of rows of power supply circuits, each row including N main power supply circuits and N redundant power supply circuits;
each of the N separate power lines being connected to and providing power to, within each row of the power supply circuits, at least one of the N main power supply circuits and at least one of the N; redundant power supply circuits, wherein the phase difference between any two of the M separate power lines is 120 degrees; and
a network switch driven by a first power line of the N separate power lines;
wherein each of the N separate power lines is connected to and configured to provide power to a substantially equal number of the power supply circuits, within±one power supply circuit.

16. The server rack system of claim 15, wherein the N main power supply circuits in each row of power supply circuits provide power to N sequential rows of the servers.

17. The server rack system of claim 16, wherein at least one of the N redundant power supply circuits in the each row of power supply circuits provides power to the N sequential rows of the servers when at least one of the N main power supply circuits in the corresponding row acts abnormally.

18. The server rack system of claim 15, further comprising:
each row of power supply circuits including a power supply management circuit configured to, for the power supply circuits in the row:
monitor a status of the N main power supply circuits;
shut down, in response to one of the main power supply circuits acting abnormally, an abnormally acting main power supply circuit and activate one of the redundant power supply circuits.

19. The server rack system of claim 15, further comprising a voltage converter configured to convert a three-phase AC power signal into separate single phase AC power signals for the N separate power lines.

20. The server rack system of claim 15, further comprising
a network switch;
N−1 additional rows of servers;
an additional row of power supply circuits, including N main power supply circuits and M redundant power supply circuits;
each of the N separate power lines being connected to and providing power to, within the additional row of power supply circuits, at least one of the N main power supply circuits in the additional row and at least one of the M redundant power supply circuits in the additional row;
wherein the N main power supply circuits of the additional row of power supply circuits provides power to the N−1 additional rows of the servers and the network switch.

21. The server rack system of claim 15, wherein at least one of the N redundant power supply circuits in the additional row of power supply circuits provides power to the network switch and the N−1 rows of the servers when at least one of the N main power supply circuits in the additional row of power supply circuits acts abnormally.

\* \* \* \* \*